United States Patent [19]

Arnold et al.

[11] 4,047,797
[45] Sept. 13, 1977

[54] FIBER OPTIC CONNECTOR

[75] Inventors: Bruce K. Arnold, El Toro; Elias A. Moreno, Huntington Beach, both of Calif.

[73] Assignee: International Telephone and Telegraph Corporation, New York, N.Y.

[21] Appl. No.: 694,305

[22] Filed: June 9, 1976

[51] Int. Cl.² .............................................. G02B 5/16
[52] U.S. Cl. .................................................. 350/96 C
[58] Field of Search ................. 350/96 C, 96 B, 96 R, 350/96 WG

[56] References Cited

U.S. PATENT DOCUMENTS

| 3,910,678 | 10/1975 | McCartney et al. | 350/96 C |
|---|---|---|---|
| 3,923,371 | 12/1975 | Dalgleish | 350/96 C |
| 3,951,514 | 4/1976 | Medina, Jr. | 350/96 C |
| 3,966,299 | 6/1976 | Osterfield et al. | 350/96 C |

Primary Examiner—John K. Corbin
Assistant Examiner—Stewart Levy
Attorney, Agent, or Firm—Thomas L. Peterson

[57] ABSTRACT

A connector is disclosed for a fiber optic cable having one or more single optical fibers. A restraint member is fixedly attached to the strength member of the fiber optic cable. The restraint member is removably mounted in the rear section of a yoke while contacts terminated to the optical fibers are releasably mounted on the forward section of the yoke. The cable restraint member provides means so that the contacts may be positioned at equal distances from the end of the cable and the yoke permits the terminated fibers to be mounted in the connector without overstressing the fibers.

14 Claims, 4 Drawing Figures

FIBER OPTIC CONNECTOR

BACKGROUND OF THE INVENTION

The present invention relates generally to a fiber optic connector and, more particularly, to a connector for a fiber optic cable having one or more single fibers therein.

Because of their fragile nature, and tendency to break when subjected to bending stresses, the individual glass fibers used in a single fiber, fiber optic cable must not be subjected to any abusive handling or bending moments during or after they are assembled into a connector. If the contacts on the individual fibers of a cable are not mounted thereon equally from the end of the cable in their proper position, when the contact terminated fibers are assembled in a connector excessive bends and stresses may occur causing damage thereto. In addition, the fibers may be subjected to excessive stresses when the ends of the fibers are broken to provide flat end faces and/or the contacts terminated to the fibers are polished prior to assembly in the connector. Further, the fibers may be overstressed if the transition from their position in the cable to their position in the connector body is too short.

It is an object of the present invention to provide a convenient method for ensuring that the individual fibers of a cable may be uniformly cut and contacts terminated thereto at the proper position on the fibers so that the fibers can be installed in a connector in a stress-free position. Another object of the invention is to provide means for fixing the relationship between the strength member of a single fiber cable and the fiber optic contacts terminated to the fibers thereof so that the terminated fibers can be readily assembled to the connector assembly without overstressing them.

SUMMARY OF THE INVENTION

According to the principal aspect of the present invention, a restraint member is fixedly attached to the strength member of a fiber optic cable having one or more single fibers therein. Such restraint member provides a constant reference ensuring that the individual fibers may be cut and terminated to the connector contacts at the proper position. A support member, preferably in the form of a yoke, has a forward section and a rear section. The cable restraint member is removably mounted on the rear section of the yoke at a predetermined position relative to the forward section thereof. Means is provided for releasably mounting the contacts terminated to the fibers of the cable on the forward section of the yoke. The yoke fixes the relationship between the cable restraint member and the fiber optic contacts so that the contacts and fibers can be readily assembled into an optical fiber connector assembly without overstressing the fibers. The yoke assembly further serves as a fixture for the optical fibers of the cable so that the ends of the fibers may be broken flat and/or the contacts polished without undue stresses or movement which may damage the fibers. Furthermore, the yoke assembly allows the required close tolerance support of the fibers to prevent stressing or bending thereof during connector mating, unmating and handling.

DESCRIPTION OF THE PREFERRED EMBODIMENTS

Figure 1:
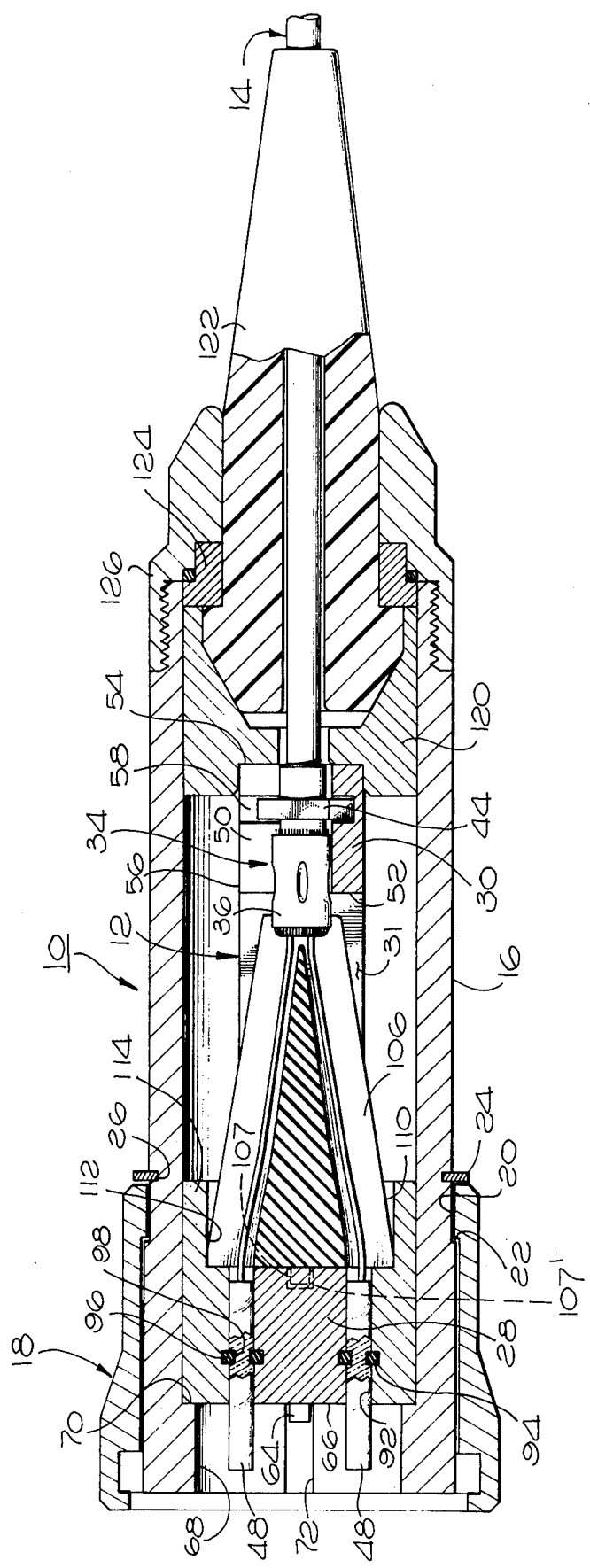
FIG. 1 is a longitudinal sectional view of a fiber optic connector utilizing the novel fiber optic cable support or yoke of the present invention.

Referring now to FIG. 1 of the drawings in detail, there is illustrated the connector of the present invention, generally designated 10. The connector comprises a support member 12 connected to a fiber optic cable 14. The support member is mounted in a cylindrical connector shell 16. A coupling nut 18 is mounted on the forward end of the shell. The nut has a radially inwardly extending annular flange 20 which is positioned behind an annular shoulder 22 on the shell 16. A retaining ring 24 is mounted in an annular groove 26 behind the flange 20 for retaining the coupling nut on the shell.

The support member 12 is in the form of a yoke, and includes a forward section 28 and a rear section 30 joined by two longitudinally extending generally flat legs 31. The legs are laterally spaced apart defining an open cavity 32 therebetween extending from the forward section to the rear section of the yoke.

A cable restraint member 34 fixed to the fiber optic cable is mounted in the rear section 30 of the yoke. The restraint member comprises a cylindrical sleeve 35 and a ring 36.

Figure 3:
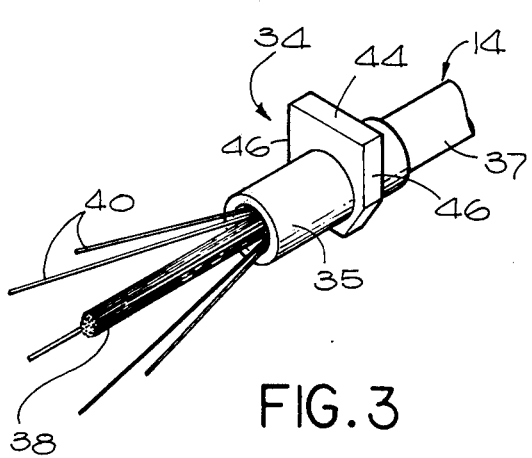
FIG. 3 is a perspective view showing an initial step in the mounting of the cable restraint member on the fiber optic cable.
Figure 4:
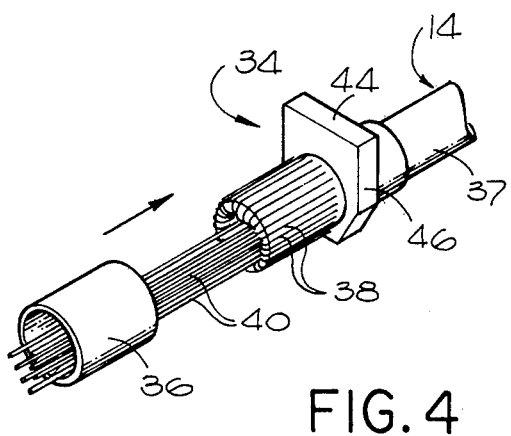
FIG. 4 is a perspective view showing a second step in the attachment of the cable restraint member to the strength member of the cable, the final attachment of the restraint member to the strength member being shown in FIG. 1.

As best seen in FIGS. 3 and 4, the cable 14 comprises a jacket 37 surrounding a central strength member 38 and a plurality of single optical fibers 40, six being shown by way of illustration only. The fibers surround the strength member 38 in the jacket. In order to attach the cable restraint member 34 to the cable, a portion of the jacket 37 is removed from the end of the cable. Before or after the removal of the end of the jacket, the sleeve 35 is slid rearwardly on the cable. The sleeve has an outwardly extending flange 44. The flange has parallel sides 46. The strands of the strength member 38 are splayed and bent rearwardly back over the sleeve 35, as seen in FIG. 4. Thereafter, the ring 36 is slid over the fibers 40 and pushed onto the sleeve 35 capturing the strands of the strength member between the ring and the sleeve. The ring is then fixedly secured to the sleeve, such as by crimping. The crimp depressions can be seen in FIG. 1. Alternatively, the sleeve 35 and ring 36 may have matching tapers so that the strands of the strength member will be frictionally retained therebetween when the ring is pushed onto the sleeve. Thus, it is seen that the cable restraint member becomes fixedly attached to the strength member of the fiber optic cable 14. Accordingly, if any longitudinally forces are applied to the cable 14, they will be carried by the cable restraint member 34 which is secured to the strength member of the cable, rather than by the individual optical fibers 40.

The restraint member 34 provides a fixed reference point on the fiber optic cable 14. Thus, the restraint member provides a convenient method for ensuring that the individual fibers 40 may be cut to the same length and connector contacts 48 connected at the proper position on the fibers so that the contacts may be installed on the yoke 12 at a uniform distance from the restraint member.

Referring again to FIG. 1, a longitudinally extending recess 50 extends from the front 52 to the rear 54 of the rear section 30 of the yoke. The recess opens to the upper surface 56 of the rear section. The width of the recess is sufficient to allow the cable restraint member 34 to slide downwardly into the recess from the top of the yoke. A transversely extending slot 58 is formed in the rear section 30. The slot intersects the recess 50 and opens at the upper suface 56 of the rear section. The slot 58 is dimensioned to slidably receive the flange 44 on the cable restraint member. The flat sides 46 of the flange slidably engage the opposed flat parallel sides of the slot to prevent rotation of the restraint member, and therefore the fiber optic cable 14, relative to the yoke 12. The mounting of the flange 44 of the cable restraint member in the transverse slot 58 locates the restraint member at a predetermined position relative to the forward section 28 of the york. The contacts 48 are connected to the optical fibers at a uniform predetermined distance from the restraint member so that when the restraint member is mounted in such predetermined position on said new section 30 and the contacts are mounted on the forward section 28 of the yoke, the fibers will be slack and, hence, will be free of stress.

Figure 2:
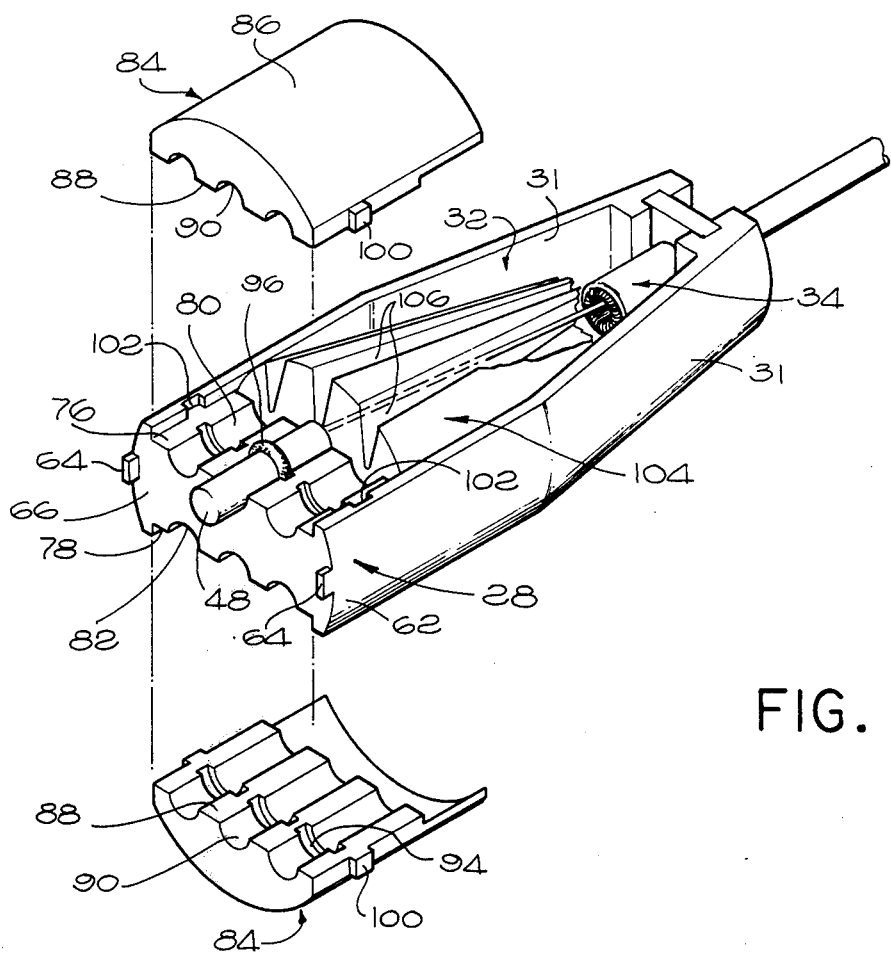
FIG. 2 is a perspective view of the yoke illustrated in FIG. 1 with two contact retaining caps separate therefrom and showing only a single fiber of a cable having a contact terminated thereto.

As best seen in FIG. 2, the forward section 28 of the yoke has arcuate sides 62 having a configuration complementary to the cylindrical interior of the shell 16. A pair of keys 64 extend forwardly from the front face 66 of the yoke adjacent to the arcuate sides 62. The forward end of the shell 16 is formed with an inwardly extending annular flange 68 which provides a rearwardly facing shoulder 70. When the yoke is inserted from the rear into the shell 16, the forward face 66 of the forward section abuts the shoulder 70 and the keys 64 are positioned so as to slide into longitudinally extending keyways 72 in the flange 68. Only one of such keyways is visible in FIG. 1. The keys 64 and keyways 72 properly orient the yoke in the connector shell so that contacts 48 terminated to the optical fibers 40 mounted on the yoke will be properly positioned for abutting engagement with contacts in a mating connector member, not shown.

The forward section 28 of the yoke has a generally flat upper surface 76 and a parallel flat lower surface 78. Three longitudinally extending semi-cylindrical grooves 80 are formed in the upper surface 76 while three longitudinally extending semi-cylindrical grooves 82 are formed in the lower surface 78. A pair of retaining caps 84 are mounted on the upper and lower sufaces of the forward section 28, respectively. The caps are identical. Each cap has an arcuate outer surface 86 complementary to the arcuate sides 62 on the forward section 28 so that when the caps are mounted on such forward section, the cap and yoke assembly has a cylindrial configuration at its front end complementary to the interior of the connector shell 16. Each cap 84 has a flat inner surface 88 formed with three longitudinally extending semi-cylindrical grooves 90 which are spaced apart a distance corresponding to the spacing of the grooves 80 and 82 on the forward section 28 of the yoke. When the caps are mounted on the upper and lower surfaces of the forward section, the grooves 90 register with the grooves 80 and 82, respectively, providing six cylindrical contact cavities 92, as best seen in FIG. 1. The contacts 48 terminated to the six optical fibers of the cable 14 are retained in the cavities 92.

Preferably each cavity has an annular groove 94 therein which receives the outer region of an O-ring 96 mounted in an annular groove 98 in each contact 48. The contacts 48 have a slightly loose fit in the cavities 92. The O-rings 96 carried by the contacts allow total contact gimbling, thereby giving free movement to the contacts for alignment with contacts mounted in the mating connector member, not shown. The O-ring attachment and gimbling arrangement also allows torsional, axial and lateral movement of each contact body. When the connector member 10 is engaged with a mating connector member, a slight axial force is produced between the mating end faces of the aligned contacts in the connector members so that the contacts 48 will shift rearwardly in their respective cavities 92, thereby compressing the O-rings 96 carried thereby, such compression of the O-rings provides axial tolerance relief for the aligned contacts and provides a resilient force urging the contacts into mating engagement.

Preferably keys 100 are formed on the sides of the caps 84 which engage in keyways 102 in the yoke for properly axially positioning the caps thereon.

It will be appreciated that by the use of an elongated yoke in accordance with the present invention, the contacts 48 are removably mounted on the forward section of the yoke while the cable restraint member 34 fixes the cable at a predetermined point at the rear section of the yoke so that overstressing of the fibers 40 is avoided due to the gradual transition from the position of the fibers exiting from the restraint member 34 to the contacts at the front of the yoke, Furthermore, the yoke fixes the relationship between the cable restraint member 34 and the fiber optic contacts 48 so thay may be assembled in the connector shell 16 without overstressing the fibers. The yoke further provides the required close tolerance support to prevent stressing or bending of the unprotected fibers during connector mating, unmating and handling. It will further be appreciated that after the restraint member 34 and the contacts 48 have been mounted on the yoke 12, the yoke may be utilized as a tool for holding the contacts during the polishing operation thereof to eliminate undue stress or movement which may damage the fibers.

In the event the connector 12 is used in field applications where it may encounter rough handling or substantial vibrations, there may be provided an elastomeric spider 104 in the yoke 12 for restraining movement of the individual fibers 40 in the cavity 32. The elastomeric spider is located immediately behind the forward section 28 of the yoke and extends rearwardly to the cable restraint member 34. The spider has six longitudinally extending slots 106 therein. Two pins 107 extend forwardly from opposite sides of the front face of the spider into mating holes 107' in the rear of the forward section 28 for properly locating the spider with the slots 106 aligned with the cavities 92. Only one pin and slot pair can be seen in FIG. 1. Preferably, the bottoms 108 of the slots taper inwardly and rearwardly to provide a smooth transition of the fibers from the restraint member 34 to the contacts 48 mounted in the forward section 28 of the yoke. The slots 106 open to the outer surfaces 110 of the spider so that the fibers 40 may be inserted laterally into such slots when the contacts 49 are located in the grooves 80 and 82 on the forward section 28 on the spider. Preferably the forward portion of the spider 104 has a height greater than the vertical distance, as viewed in FIG. 1, between the inner surfaces 112 of the rear portions 114 of the caps 84. Thus, when the caps are mounted on the forward section of the yoke and the yoke assembly is inserted into the shell 16, a radially compressive force is applied to the elastomeric spider 104 causing the slots to partially close, thereby resiliently gripping the fibers 40 to protect the fibers against high forces due to rough handling of the connector and against vibrations.

Preferably, prior to mounting the restraint member 34 on the cable 14, a compression sealing ring 120, sealing boot 122, washer 124, and gland nut 126 are positioned on the cable 114. Thus, after the yoke assembly is mounted in the connector shell 16, the gland nut 126 may be threaded on the rear of the shell 16 forcing the washer 124 forwardly to provide a sealing engagement between the forward end of the boot 122 and the sealing ring 120, and a firm positioning of the rear section of the yoke by the sealing ring. As will be appreciated, the sealing boot 122 provides strain relief for the fiber optic cable 14.

Thus, by the present invention, the individual glass fibers of a single fiber, fiber optic cable are not subjected to overstressing during or after the fibers are connected into a connector assembly. The invention, therefore, permits assembly of a fiber optic connector without special tools or a high degree of skill, allowing optical fiber interconnections for practical commercial use. While the connector of the invention has been described as applied to a six channel fiber optic cable having a central strength member, the connector may also be used with cables having a fewer or greater number of single fibers therein, including cables containing only one single fiber.

What is claimed is:

1. A connector for one or more single optical fibers of a fiber optic cable having a strength member therein comprising:
    a support member having a forward section and a rear section;
    means on said forward section for releasably mounting a contact terminated to a single optical fiber;
    means for making fixed attachment to the strength member of a fiber optic cable; and
    means for removably mounting said attachment means on said rear section in a predetermined position relative to said forward section.

2. A connector as set forth in claim 1 wherein said contact mounting means comprises:
    a groove in said forward section extending in the direction toward said rear section; and
    retaining means releasably connected to said forward section and having a groove therein registering with said first-mentioned groove defining a contact cavity.

3. A connector as set forth in claim 1 wherein:
    said contact mounting means includes a longitudinally extending contact cavity; and
    fiber vibration dampening means is mounted on said support member, said dampening means comprising an elastomeric spider behind said forward section, said spider having a longitudinally extending slot therein aligned with said cavity and adopted to receive said optical fiber.

4. A connector as set forth in claim 1 wherein:
    said attachment means comprises a sleeve having an outwardly extending flange thereon.

5. A connector as set forth in claim 4 wherein said mounting means for said attachment means comprises:
    a recess in said rear section extending in the direction toward said forward section and opening to one side of said rear section;
    a transversely extending slot in said rear section intersecting said recess and opening to said one side; and
    said recess slidably receiving said attachment means with each slot slidably receiving said flange, said flange and the sides of said slot restraining lengthwise movement of said attachment means in said yoke.

6. A connector as set forth in claim 1 wherein:
    said support member comprises a yoke including two longitudinally extending legs connecting said forward and rear sections, said legs being laterally spaced apart defining an open cavity therebetween in which optical fibers of the cable may be spread apart.

7. A connector as set forth in claim 6 wherein:
    said forward section has an upper surface and a lower surface; and
    said mounting means comprises at least one groove in each said upper and lower surface and extending toward said rear section, and a pair of retaining means each releasably mounted on one of said surfaces and having a groove therein registering with the groove on its corresponding forward section surface defining a contact cavity.

8. A connector as set forth in claim 7 wherein:
    said attachment means comprises a sleeve having an outwardly extending flange thereon; and
    said mounting means for said attachment means comprises a recess in said rear section extending in the direction toward said forward section and opening to one side of said rear section, a transversely extending slot in said rear section intersecting said recess and opening to said one side, said recess slidably receiving said attachment means with said slot slidably receiving said flange, and said flange and the sides of said slot restraining lengthwise movement of said attachment means in said yoke.

9. An optical fiber connector terminated to a fiber optic cable having a strength member and at least one optical fiber comprising:
    an elongated yoke having a forward section and a rear section connected by at least one longitudinally extending leg;
    a contact terminated to said optical fiber;
    means on said forward section for releasably mounting said contact thereon;
    means fixedly attached to said strength member of said cable; and
    means removably mounting said attachment means on said rear section in a longitudinally predetermined fixed position relative to said forward section.

10. An optical fiber connector and cable assembly as set forth in claim 9 wherein said cable includes at least two optical fibers and comprising:
    a contact terminated to each of said fibers;
    said forward section having upper and lower surfaces; and said mounting means comprising a pair of retaining members each releasably holding one of said contacts on a respective one of said surfaces.

11. An optical fiber connector and cable assembly as set forth in claim 10 wherein:

said mounting means comprises at least one longitudinally extending groove in each said upper and lower surface, each said retaining member having a longitudinally extending groove therein registering with the groove in its corresponding forward section surface defining a cavity receiving one of said contacts.

12. An optical fiber connector and cable assembly as set forth in claim 9 wherein:

said attachment means includes a sleeve surrounding said cable and having an outwardly extending flange thereon; and said mounting means for said attachment means comprises a longitudinally extending recess in said rear section extending from the front to the rear thereof, and opening to one side of said rear section, and a transversely extending slot in said rear section intersecting said recess and opening to said one side, said sleeve being mounted in said recess with said flange being mounted in said slot.

13. An optical fiber connector and cable assembly as set forth in claim 12 wherein:

said attachement means includes a ring surrounding said sleeve, said strength member being folded back over said sleeve and being secured between said ring and sleeve.

14. An optical fiber connector and cable assembly as set forth in claim 9 including.

fiber vibration dampening means;

said dampening means comprising an elastomeric spider in said yoke between said forward and rear sections thereof; and said spider having a longitudinally extending slot therein receiving said optical fiber.

* * * * *

UNITED STATES PATENT OFFICE
CERTIFICATE OF CORRECTION

PATENT NO. : 4,047,797

DATED : September 13, 1977

INVENTOR(S) : B. K. Arnold-E. A. Moreno

It is certified that error appears in the above-identified patent and that said Letters Patent are hereby corrected as shown below:

Column 6, line 14, -- said -- should be substituted for "each."

Signed and Sealed this

Twenty-fourth Day of July 1984

[SEAL]

Attest:

GERALD J. MOSSINGHOFF

Attesting Officer     Commissioner of Patents and Trademarks